United States Patent
Jalal et al.

(10) Patent No.: US 10,185,663 B2
(45) Date of Patent: Jan. 22, 2019

(54) CACHE BYPASS

(71) Applicant: ARM Limited, Cambridge (GB)

(72) Inventors: Jamshed Jalal, Austin, TX (US); Michael Filippo, Austin, TX (US); Bruce James Mathewson, Papworth Everard (GB); Phanindra Kumar Mannava, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/427,409

(22) Filed: Feb. 8, 2017

(65) Prior Publication Data

US 2018/0225219 A1 Aug. 9, 2018

(51) Int. Cl.
*G06F 12/08* (2016.01)
*G06F 12/0888* (2016.01)
*G06F 12/0811* (2016.01)
*G06F 12/0862* (2016.01)
*G06F 12/0831* (2016.01)
*G06F 12/128* (2016.01)

(52) U.S. Cl.
CPC ...... *G06F 12/0888* (2013.01); *G06F 12/0811* (2013.01); *G06F 12/0831* (2013.01); *G06F 12/0862* (2013.01); *G06F 12/128* (2013.01); *G06F 2201/885* (2013.01); *G06F 2212/502* (2013.01); *G06F 2212/602* (2013.01); *G06F 2212/6046* (2013.01); *G06F 2212/69* (2013.01)

(58) Field of Classification Search
CPC ............ G06F 12/0897; G06F 12/0888; G06F 12/0811; G06F 12/0862; G06F 12/0831; G06F 12/128; G06F 2212/6046; G06F 2212/602; G06F 2212/69; G06F 2212/502; G06F 2201/885

See application file for complete search history.

(56) References Cited

U.S. PATENT DOCUMENTS

| | | | | |
|---|---|---|---|---|
| 5,797,026 A | * | 8/1998 | Rhodehamel | ....... G06F 12/0831 711/146 |
| 6,684,298 B1 | * | 1/2004 | Dwarkadas | ......... G06F 12/0864 711/128 |
| 2007/0233962 A1 | * | 10/2007 | Piry | ...................... G06F 9/3824 711/128 |

(Continued)

OTHER PUBLICATIONS

International Search Report and Written Opinion of the International Searching Authority dated Apr. 6, 2018 in PCT/GB2018/050213, 14 pages.

*Primary Examiner* — Hiep T Nguyen
(74) *Attorney, Agent, or Firm* — Nixon & Vanderhye P.C.

(57) ABSTRACT

A data processing apparatus is provided including a memory hierarchy having a plurality of cache levels including a forwarding cache level, at least one bypassed cache level, and a receiver cache level. The forwarding cache level forwards a data access request relating to a given data value to the receiver cache level, inhibiting the at least one bypassed cache level from responding to the data access request. The receiver cache level includes presence determination circuitry for performing a determination as to whether the given data value is present in the at least one bypassed cache level. In response to the determination indicating that the data value is present in the at least one bypassed cache level, one of the at least one bypassed cache level is made to respond to the data access request.

19 Claims, 5 Drawing Sheets

(56) References Cited

U.S. PATENT DOCUMENTS

| | | | |
|---|---|---|---|
| 2008/0270758 A1* | 10/2008 | Ozer | G06F 9/3802 |
| | | | 712/206 |
| 2013/0086324 A1 | 4/2013 | Soundararajan et al. | |
| 2014/0143493 A1 | 5/2014 | Loh et al. | |
| 2014/0156931 A1 | 6/2014 | Krick | |
| 2015/0331804 A1* | 11/2015 | Vajapeyam | G06F 12/0811 |
| | | | 711/122 |
| 2016/0188471 A1* | 6/2016 | Forrest | G06F 12/0828 |
| | | | 711/119 |

* cited by examiner

| ID | SUCCESS |
|---|---|
| 0 | 01100000 |
| 1 | 01010111 |

EXAMPLE 1

| ID | LATENCY |
|---|---|
| 2 | 3 ns |
| 6 | 12 ns |
| 7 | 27 ns |

EXAMPLE 2

FIG. 3

CACHE BYPASS

TECHNICAL FIELD

The present disclosure relates to data processing. More particularly, it relates to caches.

DESCRIPTION

In a memory hierarchy, a number of caches are provided in a hierarchical structure generally with smaller, faster caches at the top of the hierarchy, and larger, slower caches at the bottom of the hierarchy. The bottom of the hierarchy generally includes a system main memory (e.g. DRAM). A data access request typically enters at the top. Each cache level attempts to resolve the request. If the request "hits" the cache, then the data can be accessed. If the request is a "miss" then traditionally, it is passed further down the cache. However, such a request may be required to go through multiple levels in order to find the data. Each level necessitates a lookup, and so as more cache levels are added, the time taken to locate requested data within the data hierarchy can increase. Each cache level in a memory hierarchy must also deal with address hazards to avoid data coherence problems. Address hazards can occur when a data access misses a given cache hierarchy and collides with either a cache miss or a cache eviction that is already on its way out to the next cache level. If the younger transaction bypasses the address hazard then the cache access could result in getting stale data from the next cache level. For example: if the younger request is a cache miss whilst a cache eviction with dirty data is already outstanding to the next cache level, then bypassing the cache eviction can result in a data hazard (e.g. the younger request returning stale data from the next cache level).

SUMMARY

Viewed from a first example configuration, there is provided a data processing apparatus comprising: a memory hierarchy having a plurality of cache levels including a forwarding cache level, at least one bypassed cache level, and a receiver cache level, wherein said forwarding cache level is configured to forward a data access request relating to a given data value to said receiver cache level, inhibiting said at least one bypassed cache level from responding to said data access request; and said receiver cache level comprises presence determination circuitry configured to perform a determination as to whether said given data value is present in said at least one bypassed cache level, and in response to said determination indicating that said data value is present in said at least one bypassed cache level, causing one of said at least one bypassed cache level to respond to said data access request.

Viewed from a second example configuration, there is provided a data processing apparatus comprising: a memory hierarchy means having a plurality of cache level means including a forwarding cache level means, at least one bypassed cache level means, and a receiver cache level means, wherein said forwarding cache level means is for forwarding a data access request relating to a given data value to said receiver cache level means, inhibiting said at least one bypassed cache level means from responding to said data access request; and said receiver cache level means comprises presence determination means for performing a determination as to whether said given data value is present in said at least one bypassed cache level means, and in response to said determination indicating that said data value is present in said at least one bypassed cache level means, causing one of said at least one bypassed cache level means to respond to said data access request.

Viewed from a third example configuration, there is provided a data processing method for a memory hierarchy having a plurality of cache levels including a forwarding cache level, at least one bypassed cache level, and a receiver cache level, wherein forwarding a data access request relating to a given data value from said forwarding cache level to said receiver cache level, inhibiting said at least one bypassed cache level from responding to said data access request; and performing a determination as to whether said given data value is present in said at least one bypassed cache level, and in response to said determination indicating that said data value is present in said at least one bypassed cache level, causing one of said at least one bypassed cache level to respond to said data access request.

BRIEF DESCRIPTION OF THE DRAWINGS

The present invention will be described further, by way of example only, with reference to embodiments thereof as illustrated in the accompanying drawings, in which:

FIG. 3 shows the use of heuristic data in accordance with one embodiment;

DESCRIPTION OF EXAMPLE EMBODIMENTS

Figure 1:
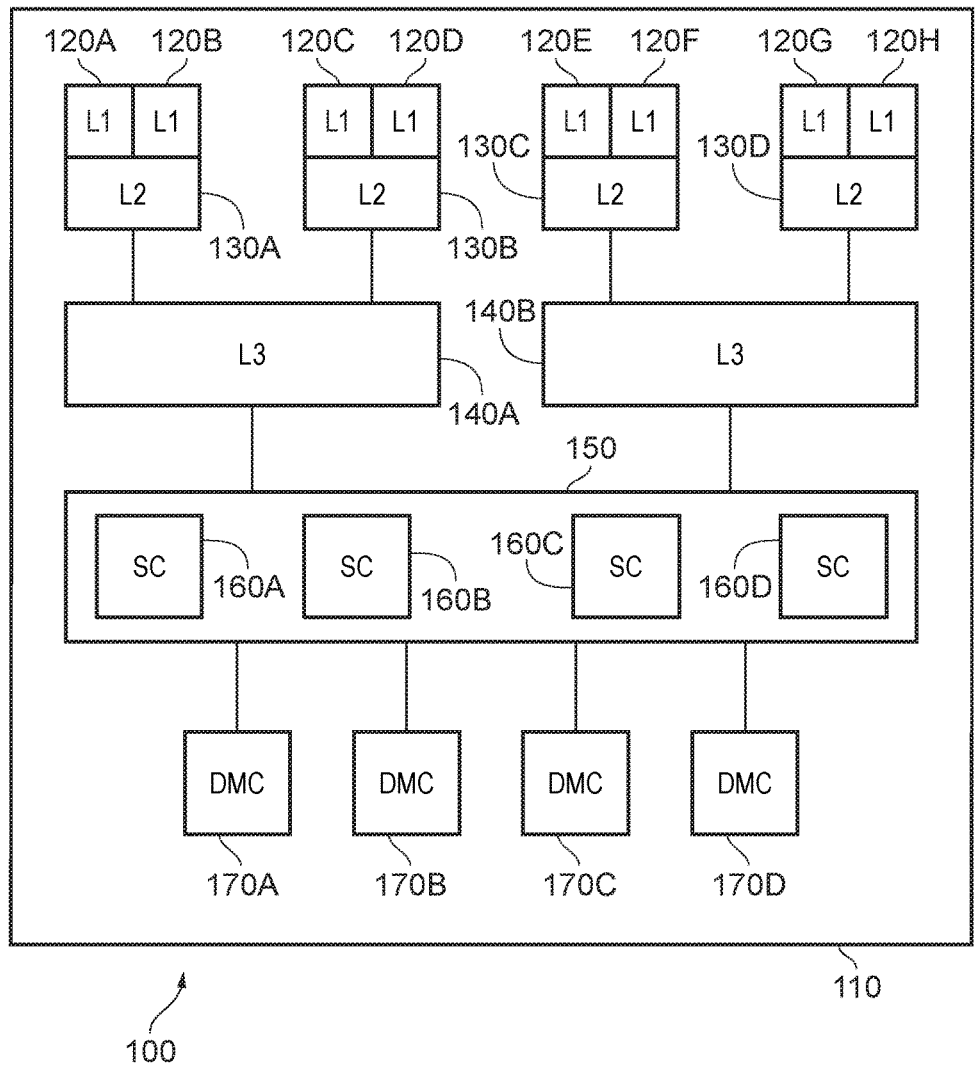
FIG. 1 illustrates a data processing apparatus in accordance with one embodiment.

Before discussing the embodiments with reference to the accompanying figures, the following description of embodiments is provided.

In accordance with one example configuration there is provided a data processing apparatus comprising: a memory hierarchy having a plurality of cache levels including a forwarding cache level, at least one bypassed cache level, and a receiver cache level, wherein said forwarding cache level is configured to forward a data access request relating to a given data value to said receiver cache level, inhibiting said at least one bypassed cache level from responding to said data access request; and said receiver cache level comprises presence determination circuitry configured to perform a determination as to whether said given data value is present in said at least one bypassed cache level, and in response to said determination indicating that said data value is present in said at least one bypassed cache level, causing one of said at least one bypassed cache level to respond to said data access request.

In the above embodiment, rather than passing a data access request for a given data value through each cache level of the memory hierarchy, at a particular "forwarding cache level" the data access request is sent to a "receiver cache level". This inhibits at least one "bypassed cache level" from responding to the data access request. For example, intermediate cache levels between the forwarding cache level and the receiver cache level are not initially given the opportunity to respond to the data access request. Once the receiver cache level receives the data access request from the forwarding cache level, the presence determination circuitry in the receiver cache level determines whether the given data value is present in one of the at least one bypassed cache levels. In this way, the presence determination circuitry effectively determines whether the forwarding of the data access request from the forwarding cache level to the receiver cache level should have taken place. If the presence determination circuitry determines that the forwarding should not have occurred, i.e. if one or the at least one bypassed cache levels is deemed to contain the given data value, then the data access request will be passed back (e.g. returned) to one of the at least one bypassed cache levels. In this way, it is possible to effectively bypass one or more cache levels of the memory hierarchy. This reduces the number of lookups that may be required for a data access request in order for the given data to be accessed, and thereby reduces memory latency. This process avoids any potential pitfalls with data hazards. Either the data was available at the bypassed cache level/levels, in which case it is returned to that cache level to be processed (in which case the data hazards are resolved in the normal manner) or the data is not present in the bypassed cache level (in which case no data hazard handling occurs for that data value).

In some embodiments, said presence determination circuitry is further configured, in response to said determination indicating that said given data value is absent from said at least one bypassed cache level, to cause said receiver cache level to: respond to said data access request if said given data value is present in said receiver cache level, and forward said data access request to a further cache level in said plurality of cache levels otherwise. In these embodiments, if the presence determination circuitry determines that the given data value is absent from the at least one bypassed cache level, i.e. if the forwarding should have occurred, then the receiver cache level is made to handle the data access request. This can in certain circumstances be achieved by responding to the data access request directly. For example, if the given data value is present in the receiver cache level, then the receiver cache level is able to access the given data itself. In other cases, i.e. if the receiver cache level itself does not contain the given data value, then the data access request is forwarded further into the memory hierarchy. For example, the data access request could be passed further downstream or closer towards the main system memory.

In some embodiments, said forwarding cache level is further configured to forward a further data access request relating to said given data value to said at least one bypassed cache level. In this way, the data access request bypasses the at least one bypassed cache level, whilst the further data access request is sent to the at least one bypassed cache level. In this manner, if the presence determination circuitry of the receiver cache level determines that the data access request is to be passed back to the at least one bypassed cache level, then a head start will be given by virtue of the further data access request already having been earlier forwarded to that cache level. In effect, the forwarding cache level may therefore produce two data access requests in response to receiving a single data access request. In this situation, the data access request could be deleted after having been forwarded to the at least one bypassed cache level, or the data access request could simply be discarded by the receiver cache level. In any event, however, the at least one bypassed cache level is still made to respond to the data access request by virtue of the further data access request for the given data having been earlier provided to the at least one bypassed cache level.

In some embodiments, at least one of forwarding said data access request and forwarding said further data access request is made on at least one condition. The forwarding cache level need not always forward the data access request to the receiver cache level and need not always forward the further data access request. In particular, either or both of these actions may be taken in accordance with at least one condition. If the condition is not met, then the bypassing will not occur (in the case of the data access request) or the forwarding of the further data access request will not occur.

There are a number of examples for the at least one condition. However, in some embodiments said at least one condition is dependent on heuristic data. Heuristic data may be generated based on previous historic behaviour of one or more parts of the data processing apparatus. For example, in some embodiments said heuristic data is dependent on an attribute of one or more elements of said memory hierarchy which fulfilled previous data access requests. For example, in some embodiments, the heuristic data may be dependent on an attribute of particular caches or cache levels of the memory hierarchy that fulfilled previous data access requests. The one or more elements of the memory hierarchy could include, for instance, caches and memories within the memory hierarchy. For example, the one or more elements of the memory hierarchy could correspond with the cache levels of the memory hierarchy.

In some embodiments, said attribute identifies a classification of said one or more elements of said memory hierarchy, which fulfilled said previous data access requests. Example classifications of the one or more elements of the memory hierarchy could include, for example, the level of the element in the memory hierarchy; the hardware used to implement the level of the hierarchy; and a physical location of the element of the memory hierarchy. The classification of the one or more elements of the memory hierarchy can be used in order to make an informed decision regarding the forwarding of the data access request or the further data access request. For example, higher levels of the memory hierarchy e.g. those further away from the main system memory might be less likely to contain the given data value referred to in the data access request or further data access request due to their smaller size. Accordingly, it may be more desirable to avoid forwarding either the data access request or the further data access request to elements used to implement higher levels of the memory hierarchy (e.g. a level one cache).

In some embodiments, said attribute indicates one of said cache levels which fulfilled said previous data access requests. As previously discussed, the attribute could indicate one of the cache levels of the memory hierarchy that fulfilled previous data access requests in order to make an informed decision regarding whether the data access request or the further data access request should be forwarded.

In some embodiments said attribute relates to a data transfer path between said one or more elements of said memory hierarchy which fulfilled previous data access requests, and said forwarding cache level. The data transfer path can comprise a series of elements of the memory hierarchy that form a path to the forwarding cache level. For example, the data transfer path between a given level one cache element (as the forwarding cache level) and a system cache element could comprise the level one cache element, followed by a level two cache element, followed by a level three cache element, followed by the system cache element, including any intervening elements.

In some embodiments, said attribute is indicative of a latency of said data transfer path. The latency of the data transfer path may give an indication as to the period of time necessary in order for the data access request or the further data access request to be responded to. For example, a high latency can be indicative of a long path, or slow/large elements. It could be desirable to avoid forwarding the data access request or the further data access request in cases where the latency is over a threshold value. In particular, by avoiding the generation of the further data access request, the number of requests in the system will be reduced, which can improve latency. Similarly, it is generally undesirable to add to the load of an element that is already experiencing a high latency, since this can make the latency worse.

In some embodiments said at least one condition comprises a requirement that said data access request is made in respect of a prefetch operation. Data access requests can be considered to be either solicited or unsolicited. In an unsolicited data access request, often referred to as prefetch request, data is acquired before it is required for use. Consequently, in due course, when the data value is actively required by a solicited data access request, the process of accessing the data from, for example, main memory, will already have been begun. In some cases, the data might already be available in a higher level cache of the memory hierarchy and can therefore be accessed quickly. In the proposed embodiments, when a data access request is solicited, there is a reasonable expectation that the data will already have been prefetched and consequently is more likely to have been stored in a high level cache. Accordingly, it is more likely that the data access request will be fulfilled within the top part of the cache, and so bypassing the higher cache levels is less desirable. In contrast, for a prefetch operation, the data is less likely to have been recently accessed, and so it is more likely that the data in question will be found deeper within the memory hierarchy. Consequently, forwarding is more appropriate.

In some embodiments, both forwarding said data access request and forwarding said further data access request are made on at least one condition. However, in some other embodiments only one of forwarding said data access request and forwarding said further data access request is made on at least one condition. Meanwhile, the other form of forwarding is either performed or not performed regardless of underlying conditions.

In some embodiments, forwarding said data access request and forwarding said further data access request are made on different sets of conditions. Meanwhile, in some other embodiments, forwarding said data access request and forwarding said further data access request are made on the same set of conditions. For example, if one form of forwarding occurs, then both forms of forwarding occur.

In some embodiments, said presence determination circuitry comprises a snoop filter. For example, the presence determination circuitry may be a snoop filter. Traditionally, snooping is used within a bus or interconnect to watch transactions between, for example, cache blocks. In this way, if two elements of the system communicate regarding a particular piece of data, other elements that have access to the bus can "snoop" and infer information regarding the location or particular pieces of data. This process can be used in order to aid coherency of the system so that the situation is avoided in which data is simultaneously changed in two different caches. However, snooping can be time consuming, since a bus may experience a large amount of traffic, and each snooper would therefore be required to perform a large number of lookups on potentially irrelevant data. A snoop filter can be used in order to limit this. For example, a snoop filter can provide a directory of caches that contain particular data values. In this way, snooping can be inhibited for those caches that do not contain a data value being referred to. In a similar manner, a snoop filter can therefore be used in order to determine whether the at least one bypassed cache level contains a data value being referred to in a data access request. This can therefore be used to determine whether the data access request should be forwarded back to the at least one bypassed cache level in order for the data access request to be resolved.

In some embodiments, said forwarding cache level is a level two cache said at least one bypassed cache level is a level three cache; and said receiver cache level is a system cache. Traditionally, a level two cache is both smaller and faster than a level three cache. Similarly, a level three cache is generally smaller and faster than a system cache (also referred to as a level four cache).

In some embodiments, said forwarding cache level and said at least one bypassed cache level are the same. In such embodiments, a forwarding cache level forwards the data access request before performing a local lookup in its cache in respect of the data access request. Accordingly, the forwarding cache level is or at least is comprised within the at least one bypassed cache level. In other embodiments, the forwarding cache level forwards the data access request after having performed a local lookup in its cache and hence the at least one bypassed cache level is completely separate from the forwarding cache level. The latter embodiments would require additional connections between the cache levels in order to enable, e.g. a level one cache to forward the data access request to a level three cache.

Particular embodiments will now be described with reference to the figures.

FIG. 1 illustrates a data processing apparatus 100 in accordance with one embodiment. As shown, the data processing apparatus 100 comprises a memory hierarchy 110. The memory hierarchy 110 comprises a number of cache levels L1, L2, L3, SC. Within the memory hierarchy, there is provided a number of level one caches 120A-120H. In this embodiment, the level one cache 120A-120H corresponds with the top of the memory hierarchy. As a consequence, when a data access request is issued, it is first issued to one of the level one caches 120-120H. Also in this embodiment, a number of level two caches 130A-130D are provided. The level two caches 130A-130D are arranged such that they are shared by pairs of level one caches 120A-120H. For example, a first level one cache 120A and a second level one cache 1209 shared a level two cache 130A. In this embodiment, each of the level two caches 130A-130D is bigger and slower than each of the level one caches 120A-120H. In other embodiments, the level two cache 130A-130D may be the same size or even smaller than the level one cache 120A-120H. A pair of level three caches 140A, 140B is also provided. These are larger and slower than even the level two caches 130A-130D, although again, in other embodiments, this may not be the case. Similarly, each of the level three caches 140A, 140B is shared by a pair of level two caches 130A-130D. For example, a first level two cache 130A and a second level two cache 130B are shared by a single level three cache 140A. Each of the level three caches 140A, 140B is connected to a series of system caches 160A-160D via an interconnect 150. The system caches 160A-160D form a further cache level of the memory hierarchy 110, and are often referred to as level four caches.

Finally, the interconnect 150 is connected to a series of dynamic memory controllers 170A-170D. The dynamic memory controllers 170A-170D implement a main system memory, i.e. they provide a DRAM. The main system memory is the last level of the memory hierarchy 110. It is the biggest and slowest of the various levels within the memory hierarchy 110.

In this embodiment, pairs of level one caches 120A-120H, together with one of the level two caches 130A-130D are provided for each processor core. Each level three cache is shared between pairs of processor cores, which form a single processor chip. The processor chips then communicate with each other via the interconnect 150.

As already explained, a data access request enters via one of the level one caches 120A-120H from a processor core. If the requested data value is located within the local one of the level one caches 120A-120H (i.e. if there is a "hit"), the data value can be accessed (read from or written to). If the data value is not located within the local one of the level one caches 120A-120H, then a "miss" occurs, and the data access request is forwarded to the level two cache 130A-130D. The process repeats. Each time a miss occurs, the data access request is forwarded further down the memory hierarchy 110 towards the main system memory.

Figure 2:
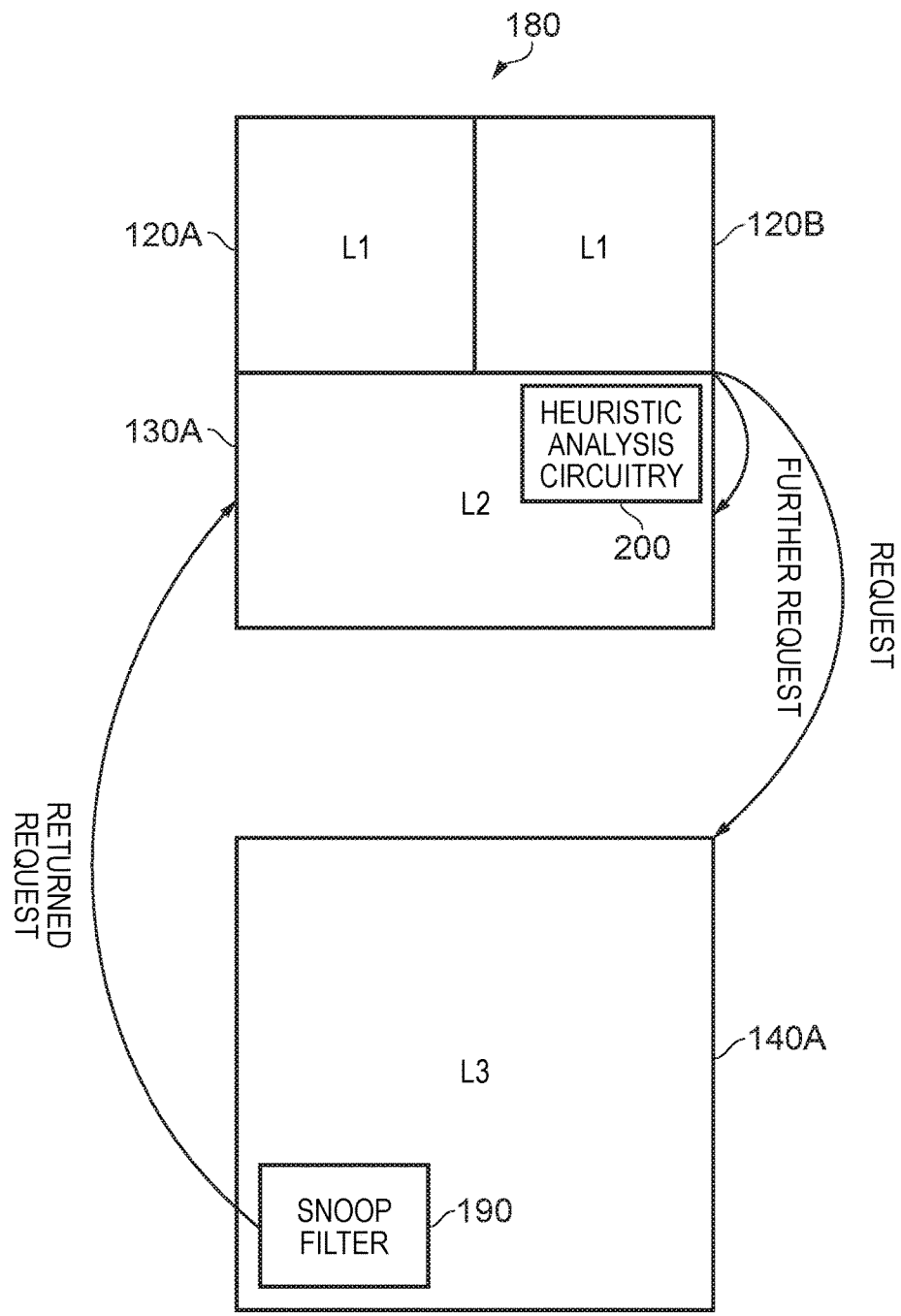
FIG. 2 shows an example of a cache level in a memory hierarchy being bypassed in accordance with one embodiment.

FIG. 2 illustrates an example of a data access request being forwarded from a processor core 180 to a level three cache 140A. In this embodiment, the level two cache (the forwarding cache level) forwards the request without locally looking up the requested data value. The level two cache is therefore also a bypassed cache level. The level three cache 140A (the receiver cache level) uses its snoop filter 190 to determine whether the data value referenced in the data access request is stored at the bypassed level two cache 130A or not. If so, then the data access request is returned back to the level two cache 130A for fulfilment. Otherwise, the level three cache 140A handles the request itself either by returning the data value if it is stored locally at the level three cache 140A, or by forwarding the data access request onward in the memory hierarchy 110 if the data value is not found locally. For example, the level three cache 140A could forward the data access request to one of the system caches 160A-160D.

In this embodiment, as well as forwarding the data access request, the level two cache 130A also creates a further data access request, which is handled locally. This way, if and when the data access request is returned by the level three cache 140A, then the process of locally looking up the requested data value has already begun, thereby allowing the returned request to be discarded. This therefore saves time in the event that the level three cache 140A determines that the level two cache 130A does contain the requested data value. Accordingly, regardless of whether the data value is actually stored in the level two cache 1304 or the level three cache 140A, there is no significant increase in latency as a result of the lookup of the data value. Indeed, in some cases, such as when the data value is not stored at the level two cache 130A, the lookup performed by the level two cache 130A can be avoided, thereby saving time in resolving the data access request. In some embodiments, the return of the data access request can be inhibited if a further request was also issued to the bypassed cache level.

Also in this embodiment, heuristic analysis circuitry 200 is used in order to determine whether the data access request is to bypass the lookup performed in the level two cache circuitry 130A. In addition, the heuristic analysis circuitry 200 is used to determine whether the further request should be generated. In this way, each of the data access request and the further data access request can be forwarded in dependence on particular conditions. There are a number of different conditions and heuristics that can be considered. Some of these are shown with reference to FIG. 3. In this embodiment, the level two cache 130A is both bypassed and performs the role of forwarding the request onwards to the level three cache 140A. However, in other embodiments, the cache or caches that are bypassed may be different from the cache that performs the forwarding. For example, in this embodiment, the forwarding could be performed by level one cache 120B after a lookup in level one cache 120B has been performed. In this way, the level two cache 130A remains as the cache that has been bypassed. The returned data access request will be returned to the bypassed cache, i.e. level two cache 130A.

Note that this process avoids problems with data hazards. In particular, any bypassed cache levels (in this case, the level two cache) either does not have the requested data, in which case no data hazard related issues arise as a consequence of bypassing the level two cache, or the level two cache does have the requested data, in which case the request is handled by the level two cache (after a failed bypass attempt) in the normal manner. In this latter case, because the level two cache responds to the data access request in the normal manner, the usual data hazard avoidance can be used.

FIG. 3 illustrates two examples of the use of heuristics for determining whether the data access request or the further data access request should be forwarded. These heuristics could, for instance, be used by a level two cache 130A.

In example 1, the cache determines, for previous data access requests that originated from each of the two upstream level one caches 120A, 120B (each identified by an ID number), whether or not that request hit in the local level two cache 130A. Each of the last eight attempts is tracked. In this way, it is possible to make an assessment regarding whether a future data access request is likely to hit in the level two cache 130A or not based on the cache from which the data access request originated. For example, it could be determined that a hit is likely to occur if the number of previous hits from previous data access requests is above some predetermined threshold value such as four. Consequently, for a future data access request, it is possible to make a determination regarding whether the hit will occur with the level two cache 130A, by considering the source of the data access request (i.e. the first level one cache 120A or the second level one cache 120B) and the number of previous hits from that level one cache. If a hit in the level two cache 130A is likely, then no bypassing takes place and the data access request proceeds as per normal. Alternatively, if a miss is likely, then bypassing is encouraged.

In a second example, the level two cache 130A tracks a latency for each of the further downstream cache levels (each identified by a particular ID number). In this way, a particular cache level may be bypassed if the current latency indicates that there is a significant gain to be made. For example, if the level two cache 130A has an unusually large latency at present, then it may be determined to be appropriate to bypass the level two cache 130A. By providing a latency for multiple caches, it is possible to bypass multiple cache levels in the memory hierarchy 110. For example, if both the level two cache and the level three cache were considered to have an unusually large latency (i.e. the latency was above some predetermined value), then the data access request could be forwarded directly to a system cache 160A.

Such heuristics can be used in order to determine a condition for forwarding the data access request and/or the further data access request. For example, the forwarding of the further data access request may be dependent on a low latency at the cache in question, since the forwarding of the further data access request will cause a latency to be increased by virtue of the data access requests being responded to increasing. However, issuing the further data access request could be restricted to instances where it is considered that there is a reasonable chance that the at least one bypassed cache level will contain the requested data.

Figure 4A:
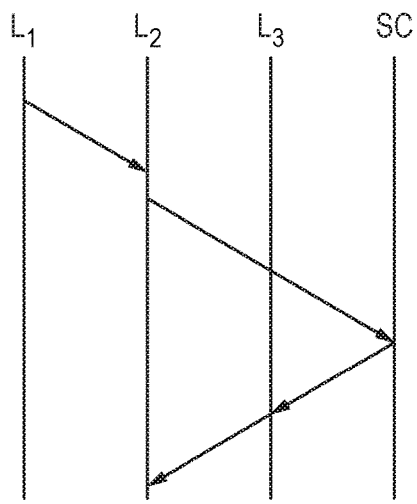
FIG. 4A illustrates a first example of bypassing multiple cache levels in accordance with one embodiment.

FIG. 4A illustrates an example of the passing of data requests between the different cache levels in accordance with one embodiment. In FIG. 4A, the X axis represents each of the caches level one, level two, level two, and the system cache. The Y axis represents time. Consequently, it can be seen that initially, as the consequence of a miss at the level one cache, the data access request is forwarded to the level two cache. The level two cache determines that the appropriate conditions are met for forwarding the data access request to the system cache. Accordingly, the level two cache itself, and the level three cache are both bypassed. Once at the system cache, the snoop filter of the system cache determines that the data being requested is in the data access request can be found at one of the upstream caches. In this embodiment, this causes the data access request to be forwarded to the level three cache. At the level three cache, the snoop filter determines that the data being requested is held at a still further upstream cache level, and consequently the data access request is forwarded to the level two cache where the data access request can be resolved.

Figure 4B:
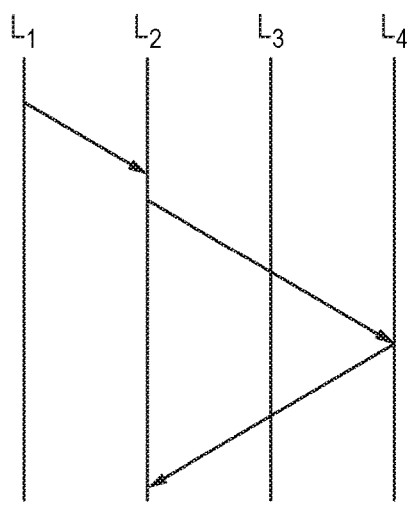
FIG. 4B illustrates a second example of bypassing multiple cache levels in accordance with one embodiment.

In FIG. 4B, a similar process occurs. However, at the system cache, when it is determined that the data value referred to by the data access request is stored in a upstream cache, the data access request is returned to the first of the bypassed cache levels, the level two cache. If, of course, the data was actually stored in the level three cache, then a miss would occur at the level two cache, and this would cause the data access request to subsequently be forwarded back down to the level three cache.

It will be appreciated that there are a number of different other approaches that could be used. For example, a "binary search" could be used in order to reduce the time taken to search for the requested data across each of the caches. A yet more advanced technique may skew such a search keeping in mind that the lower level caches are larger. Yet other techniques may be employed. For example, the snoop filter could provide a "hint" regarding the upstream cache level that contained the requested data. The data access request could then be returned to the cache level where the data was held.

Figure 5:
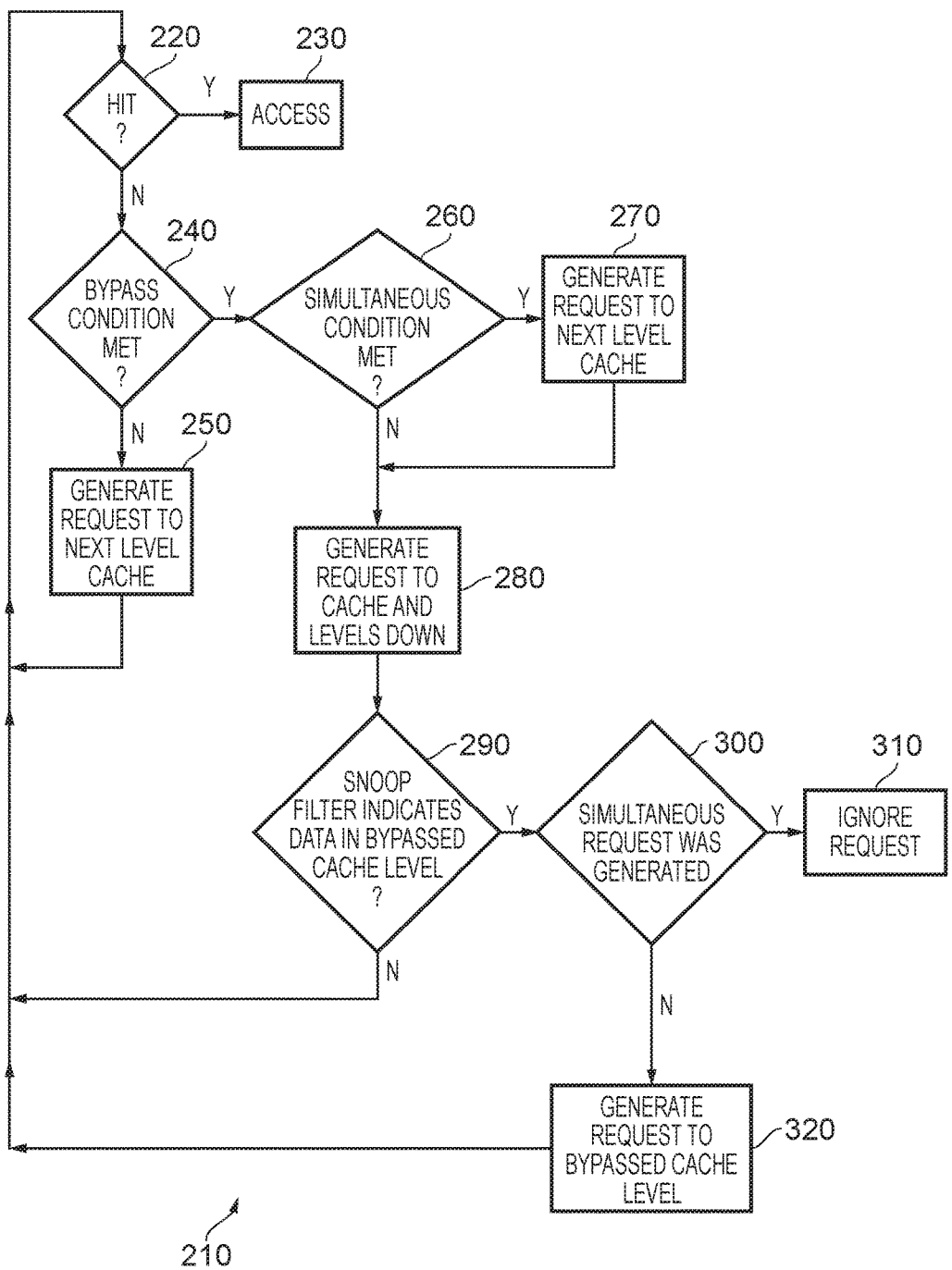
FIG. 5 shows, in the form of a flow chart, a method of performing data processing in accordance with one embodiment.

FIG. 5 illustrates a flow chart 210 illustrating a method of data processing in accordance with one embodiment. The process begins at step 220, where it is determined whether a hit at the current cache level has occurred or not. If so, then at step 230, the data value is accessed. Otherwise, at step 240, it is determined whether or not the condition or conditions for performing a bypass have been met. If not, then at step 250 the data access request to the next cache level is generated/forwarded. The process then proceeds back to step 220, where it is determined whether a hit occurs at this next cache level or not. Otherwise, if the bypass condition is met at step 240. Then at step 260 it is determined whether the condition or conditions for simultaneous requests is met. If so, then at step 270, the further request is generated for the next cache level. In either event at step 280, the data access request is forwarded to a cache level two cache levels down. For example, if the level two cache was doing the forwarding and a lookup had not yet been performed in the level two cache, then two levels down would correspond with the level three cache (i.e. the cache after the next cache to be looked up in). Similarly, if the level one cache was doing the forwarding after having performed a lookup in the level one cache, then two levels down would still be the level three cache, since the next cached lookup would be the level two cache and the one after that would be the level three cache. The process then proceeds to step 290, where it is determined whether the local snoop filter indicates that the data requested by the data access request is located in the bypassed cache level or cache levels. If not, then the process returns to step 220, where it is determined whether a hit occurs in the local cache or not. If so, then at step 300, it is determined whether a simultaneous request was generated or not. If so, then the request is simply ignored, since the generated further request has already been issued to the cache in question. If no further request was generated, then at step 320, a request is generated for the bypassed cache level. The process then proceeds to step 220, where it is determined whether or not a hit occurs in this bypassed cache level.

Accordingly, the above embodiments illustrate how it is possible for a at least one cache level to bypassed. The bypassing of the cache level(s) only occurs if appropriate, and if appropriate, this enables the lookup of a data value held further downstream in the memory hierarchy 110 to be accessed more quickly than if every single cache level in the memory hierarchy 110 must be accessed in turn. Consequently, lower average memory latency may be achieved. This process is sensitive to the possibility of data hazards and avoids the introduction of data hazards as a consequence of the data bypassing cache levels.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:
1. A data processing apparatus comprising:
a memory hierarchy having a plurality of cache levels including a forwarding cache level, at least one bypassed cache level, and a receiver cache level, wherein
said forwarding cache level is configured to forward a data access request relating to a given data value to said receiver cache level, bypassing a cache lookup in said at least one bypassed cache level; and said receiver cache level comprises presence determination circuitry configured to perform a determination as to whether said given data value is present in said at least one bypassed cache level, and in response to said determination indicating that said data value is present in said at least one bypassed cache level, causing one of said at least one bypassed cache level to respond to said data access request.

2. A data processing apparatus according to claim 1, wherein said presence determination circuitry is further configured, in response to said determination indicating that said given data value is absent from said at least one bypassed cache level, to cause said receiver cache level to:
respond to said data access request if said given data value is present in said receiver cache level, and
forward said data access request to a further cache level in said plurality of cache levels otherwise.

3. A data processing apparatus according to claim 2, wherein
said further cache level comprises memory controller circuitry.

4. A data processing apparatus according to claim 1, wherein
said forwarding cache level is further configured to forward a further data access request relating to said given data value to said at least one bypassed cache level.

5. A data processing apparatus according to claim 4, wherein
at least one of forwarding said data access request and forwarding said further data access request is made on at least one condition.

6. A data processing apparatus according to claim 5, wherein
said at least one condition is dependent on heuristic data.

7. A data processing apparatus according to claim 6, wherein
said heuristic data is dependent on an attribute of one or more elements of said memory hierarchy which fulfilled previous data access requests.

8. A data processing apparatus according to claim 7, wherein
said attribute identifies said one or more elements of said memory hierarchy which fulfilled said previous data access requests.

9. A data processing apparatus according to claim 7, wherein
said attribute identifies a classification of said one or more elements of said memory hierarchy, which fulfilled said previous data access requests.

10. A data processing apparatus according to claim 9, wherein
said attribute indicates one of said cache levels which fulfilled said previous data access requests.

11. A data processing apparatus according to claim 7, wherein
said attribute relates to a data transfer path between said one or more elements of said memory hierarchy which fulfilled previous data access requests, and said forwarding cache level.

12. A data processing apparatus according to claim 11, wherein
said attribute is indicative of a latency of said data transfer path.

13. A data processing apparatus according to claim 5, wherein
said at least one condition comprises a requirement that said data access request is made in respect of a prefetch operation.

14. A data processing apparatus according to claim 5, wherein
both forwarding said data access request and forwarding said further data access request are made on at least one condition.

15. A data processing apparatus according to claim 5, wherein
forwarding said data access request and forwarding said further data access request are made on different sets of conditions.

16. A data processing apparatus according to claim 1, wherein
said presence determination circuitry comprises a snoop filter.

17. A data processing apparatus according to claim 1, wherein
said forwarding cache level is a level two cache;
said at least one bypassed cache level is a level three cache; and
said receiver cache level is a system cache.

18. A data processing apparatus according to claim 1, wherein
said forwarding cache level and said at least one bypassed cache level are the same.

19. A data processing method for a memory hierarchy having a plurality of cache levels including a forwarding cache level, at least one bypassed cache level, and a receiver cache level, the data processing method comprising:
forwarding, by the memory hierarchy, a data access request relating to a given data value from said forwarding cache level to said receiver cache level, bypassing a cache lookup in said at least one bypassed cache level; and
performing a determination, by the memory hierarchy, as to whether said given data value is present in said at least one bypassed cache level, and in response to said determination indicating that said data value is present in said at least one bypassed cache level, causing one of said at least one bypassed cache level to respond to said data access request.

\* \* \* \* \*